Jan. 5, 1932.  G. J. MacFADDEN  1,839,403

VALVE STRUCTURE FOR PUMPS

Filed Sept. 20, 1929

Inventor
G. J. MacFADDEN

Patented Jan. 5, 1932

1,839,403

UNITED STATES PATENT OFFICE

GEORGE J. MacFADDEN, OF QUINCY, ILLINOIS, ASSIGNOR TO GARDNER-DENVER COMPANY, OF DENVER, COLORADO, A CORPORATION OF DELAWARE

VALVE STRUCTURE FOR PUMPS

Application filed September 20, 1929. Serial No. 394,118.

The present invention relates to valve structures for pumps, the object being to provide a simple, novel and effective mechanism in which the valve has metal seating and also a packing seating that insures an effective leak-proof joint. Another important object is to provide a mounting for the valve that is of a simple and effective character.

In the accompanying drawings.

Figure 1:
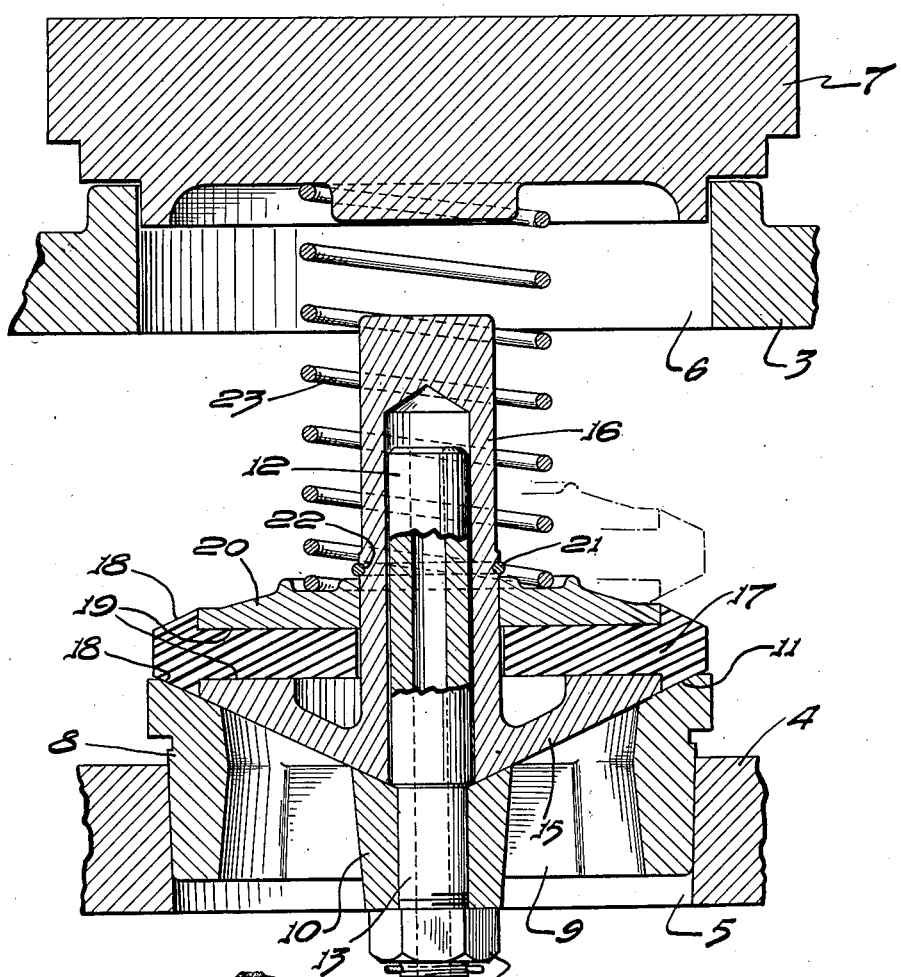
Figure 1 is a vertical sectional view through a portion of a pump showing the preferred form of construction.
Figure 2:
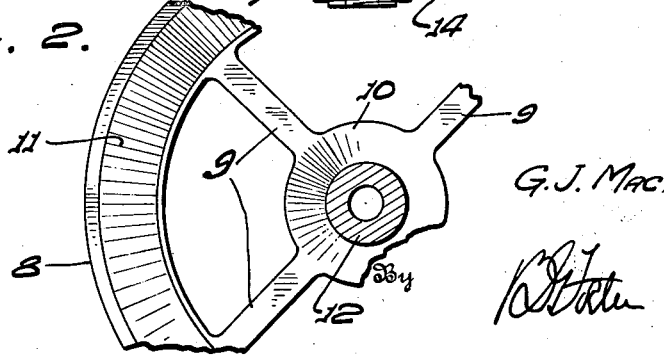
Figure 2 is a detail plan view of a portion of the spider.

In the embodiment disclosed a portion of the pump case is shown at 3 and a portion of the cylinder wall is illustrated at 4. In the wall 4 is an outlet opening 5 and there is an opening 6 in the casing 3 in line with the opening 5. The opening 6 is closed by the usual bonnet 7.

In the opening 5 is a valve seat member comprising a ring 8 provided with a spider 9 having a central hub 10. The outer portion of the ring 8 extends beyond the wall 4 and has its end face beveled or inclined to form a valve seat 11. The hub 10 carries a fixed post. This post is tubular in form and is designated 12. It is provided at its inner end with a reduced shank portion 13 seated in the hub 10 and held in place by a nut 14 threaded upon its inner end.

The valve proper consists of a conical body 15 whose beveled face corresponds to the beveled face 11 of the valve seat, the marginal portion of the body 15 contacting with the face 11. This valve body 15 has a preferably integral tubular stem 16 that slidably receives the post 12 and has its outer end portion closed over the end of said post. As a consequence the internal chamber of the valve stem 16 has communication with the interior of the pump cylinder solely through the bore of the post 12 and has no communication with the exterior of the pump cylinder 4. Located on the stem 16 is a valve gasket disk of rubber or other suitable yielding material. This disk is designated 17 and has its marginal portions oppositely beveled as shown at 18. These portions project beyond the body 15 and the inner face 18 contacts with the face 11 of the valve seat. The portions of the gasket 17 within the beveled margin are cut away to provide recessed seats 19. In one of these seats the body 15 engages, in the other is seated a holding washer or disk 20. It will be noted that the packing gasket 17 and disk 20 can slide upon the stem 16. This sliding movement is, however, limited by a retaining ring 21 engaged in an annular groove 22 formed in the stem 16. A coiled spring 23 is interposed between the bonnet 7 and the disk 20. This spring 23 performs two functions. It serves to urge the valve as an entity, to its seat and it further acts to force the washer 20 and gasket 17 toward the body 15 so as to effect a clamping action on the gasket 17.

With this structure it will be evident that the valve body has a metal contact with the valve seat and outside said contact is the bearing of the packing gasket on said seat. An effective seal is thus provided that will prevent leakage and take care of material wear between the parts. The gasket, it will be noted, being of the same contour on both sides is reversible so that either side may be employed and as the active side wears, the gasket can be reversed.

From the foregoing, it is thought that the construction, operation and many advantages of the herein described invention will be apparent to those skilled in the art without further description, and it will be understood that various changes in the size, shape, promotion and minor details of construction may be resorted to without departing from the spirit or sacrificing any of the advantages of the invention.

What I claim, is:

In a valve structure, the combination with a valve seat member, of a spider carrying a tubular post that passes through the seat member, a valve head having a tubular stem that slidably receives the post and having a closed end covering the same, a valve gasket on the stem that cooperates with the valve seat, a holding washer on the stem and cooperating with the valve body to clamp the gasket, said gasket and washer being removable over the closed end of the stem, a retainer on the stem that prevents the detachment of the gasket and washer, and a spring surrounding the stem and bearing against the washer to cause it to clamp the gasket against the body, said spring serving to urge the valve to its seated position.

In testimony whereof, I affix my signature.

GEORGE J. MacFADDEN.